United States Patent [19]

Jordan

[11] Patent Number: 5,386,922
[45] Date of Patent: Feb. 7, 1995

[54] CONTAINER WITH STACKABLE TRAYS

[76] Inventor: Raymond L. Jordan, P.O. Box 4472, Annapolis, Md. 21403

[21] Appl. No.: 122,297

[22] Filed: Sep. 17, 1993

[51] Int. Cl.⁶ ............................................. B65D 21/02
[52] U.S. Cl. ............................. 220/23.83; 220/4.27; 220/505; 220/528; 220/771; 206/514; 206/373
[58] Field of Search .................... 220/4.27, 23.4, 23.6, 220/23.83, 23.86, 503, 505, 507, 524, 528, 529, 755, 771; 206/514, 501, 503, 504, 373, 372

[56] References Cited

U.S. PATENT DOCUMENTS

| D. 325,281 | 4/1992 | Jordan ................... D3/74 |
| 1,277,253 | 8/1918 | Paschal ............... 220/23.4 |
| 1,750,258 | 3/1930 | Brown . |
| 1,760,761 | 5/1930 | March . |
| 1,977,092 | 10/1934 | Scurlock .............. 220/23.4 |
| 2,292,499 | 8/1942 | Walsh . |
| 2,919,169 | 12/1959 | Jackson . |
| 2,980,280 | 4/1961 | Herlow ............... 220/23.83 |
| 3,117,692 | 1/1964 | Carpenter et al. ........ 220/23.6 |
| 3,398,827 | 8/1968 | Laskin ............... 220/23.83 |
| 3,749,278 | 7/1973 | von Boch-Galheu ..... 220/23.83 |
| 3,751,845 | 8/1973 | van Leeuwen . |
| 4,619,363 | 10/1986 | Wolfseder ............ 220/23.6 |
| 4,756,412 | 7/1988 | Graves ................. 206/372 |
| 4,911,295 | 3/1990 | Venegoni . |
| 4,925,047 | 5/1990 | Valentine et al. ........ 220/755 |
| 5,044,537 | 9/1991 | Buffalo . |
| 5,062,539 | 11/1991 | Chandler . |
| 5,154,303 | 10/1992 | Jordan . |
| 5,199,587 | 4/1993 | Ota et al. .............. 220/755 |

FOREIGN PATENT DOCUMENTS

| 874923 | 8/1942 | France .............. 220/23.83 |
| 1137095 | 5/1957 | France .............. 220/771 |

Primary Examiner—S. Castellano
Attorney, Agent, or Firm—Richard C. Litman

[57] ABSTRACT

A system of trays and inserts placed in each tray, for converting a bucket to an organized receptacle for storing and dispensing small parts or objects. Trays are circular, and are stacked within the bucket. Each tray has low partitions, dividing the tray into pie slice segments. An insert is placed in each segment. Inserts have constricted necks, enabling them to be grasped readily by the fingers of a user, even when the insert is filled with small objects. An individual tray is thereby readily removable, even if filled with small parts, independently of neighboring inserts. Inserts are optionally provided with tightly fitting caps. Both trays and inserts are provided in variable vertical dimensions. Two short inserts or trays occupy the same height within the bucket of a single tall insert or tray. Thus, the bucket is selectively reconfigurable to provide a desired combination of inserts and trays.

15 Claims, 3 Drawing Sheets

CONTAINER WITH STACKABLE TRAYS

BACKGROUND OF THE INVENTION

1. Field of the Invention

The present invention relates to trays placed in a bucket or like container, and separate, removable compartmented inserts placed in those trays. The trays and separate inserts provide a general utility bucket into an organized container for small parts.

2. Description of the Prior Art

In manufacturing, assembling, and construction of buildings, it is frequently necessary to maintain at hand a selection of fasteners, small parts, and like items. These items must be separated into collections of like objects, so that a user retrieves one such object, and spends little time verifying that he or she has retrieved the correct item. Storing a variety of such small parts or objects, and making the same readily available for retrieval has been the subject of prior art patents.

The present applicant has developed a system of stackable trays which, when placed in a general utility bucket, provides a person with an inexpensive, rugged, practical means of storing and organizing small parts. This system is seen in U.S. Pat. Nos. D325,281, issued on Apr. 7, 1992, and 5,154,303, issued on Oct. 13, 1992. Each tray overlies its predecessor, and is divided into plural compartments.

Another system of trays for organizing a bucket is seen in U.S. Pat. No. 4,911,295, issued Mar. 27, 1990 to Daniel E. Venegoni. Venegoni '295 discloses a series of vertically stacked trays, each subdivided into compartments.

The above devices of the present applicant and of Venegoni '295 share a feature. In these patents, each tray has an open center, with a strap or handle straddling the opening. Each tray is readily grasped and removed by the strap or handle.

The relevant art cited above explicitly cooperates with buckets for conversion to organized storage receptacles, which is an object of the present invention. There are other known arrangements providing compartmentalized, vertically stacked trays for receptacles, such as those shown in U.S. Pat. Nos. 2,919,169, issued to Carl A. Jackson on Dec. 29, 1959, and 3,751,845, issued to Marion van Leeuwen on Aug. 14, 1973.

Vertically stacked trays for organizing a receptacle are further seen in U.S. Pat. Nos. 2,292,499, issued to William Walsh on Aug. 11, 1942 and 5,062,539, issued to John W. Chandler on Nov. 5, 1991.

Compartmentalizing a tray is seen in U.S. Pat. Nos. 1,750,258, issued to Donald D. Brown on Mar. 11, 1930, and 5,044,537, issued to Jeffery P. Buffalo on Sep. 3, 1991.

Separate, complementary, pie slice shaped compartments for organizing a single level of a receptacle is exemplified in U.S. Pat. No. 1,760,761, issued to Carl March on May 27, 1930.

None of the above inventions and patents, taken either singly or in combination, is seen to describe the instant invention as claimed.

SUMMARY OF THE INVENTION

The present invention relates to an improvement over applicant's U. S. Pat. Nos. D325,281 and 5,154,303. In this improvement, readily removable inserts are provided for each tray. These inserts may include optional individual tightly fitting covers or caps.

Both the trays and inserts are modular, being provided in several sizes with respect to height of each tray or insert. A tray is provided with one tall or two short inserts. Either possibility results in a single or combined height approaching the height of the tray. In like manner, trays are of the tall or short variety, two short trays combining to equal the height of a single tall tray.

Trays are circular, conforming to the configuration of the bucket. The trays have low partitions which stabilize the inserts placed in each tray. The inserts are configured in the manner of pie slices, each occupying one fourth of the tray area between adjacent partitions. Inserts have constricted portions, which enables a user to grasp the insert with his or her fingers. This arrangement enables grasping of an insert even when it is full of parts. This avoids interference which would ensue if the grasping means comprised a handle or the like spanning the receptacle portion of an insert filled with objects. This arrangement also obviates the necessity of removing an entire tray to remove a single insert.

Thus the present invention provides a bucket vertically divided into many tiers, each tier being horizontally subdivided into many compartments. Tier height and tier subdivision are selectively and readily reconfigurable to accommodate different combinations of parts. Inserts defining a tier subdivision are readily removed, independently of a neighboring insert.

Accordingly, it is a principal object of the invention to convert a bucket into a storage and dispensing receptacle.

It is another object of the invention to divide a converted bucket into selectively variable vertical tiers.

It is a further object of the invention to subdivide any one tier selectively into variable height compartments.

Still another object of the invention is to provide removable closures for the variable height compartments.

It is an additional object to configure the variable height compartments so as to be readily grasped by one's fingers without causing interference between the contents of the compartment and the user's fingers.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
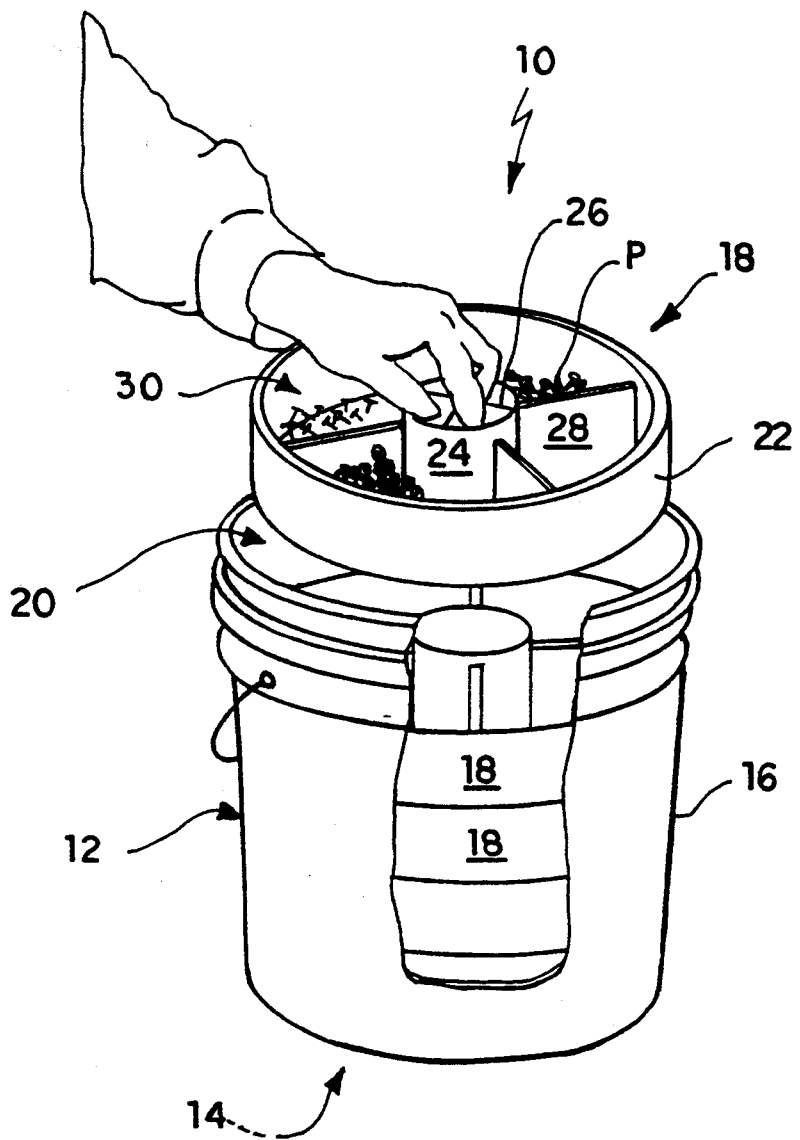
FIG. 1 is an environmental, perspective view of the invention, showing a tray being removed from a bucket, the view being partially broken away to reveal internal detail (inserts normally provided are omitted for the sake of clarity of this view).

Turning now to FIG. 1 of the drawings, the invention is seen to comprise a bucket or the like, adapted to become a storage and dispensing receptacle 10. Receptacle 10 is very convenient for handling several types of small parts or objects P generally used in quantity, such as nails, screws, nuts, and similar fasteners, for example. A preferred bucket is provided by a general utility bucket 12, commonly available for handling bulk construction or consumer materials, having a floor or lowermost panel 14 and an upstanding, bounding wall 16.

Into bucket 12 are placed vertically stackable trays 18, each having a bottom 20 and an upstanding, perimetric wall 22. A hollow, central column 24 has handle members 26 spanning the open top of column 24. Tray 18 is therefore grasped and lifted by hand, as shown in FIG. 1. Divider walls 28 divide a tray into four compartments 30.

Trays 18 are configured generally to conform to the configuration of bucket 12, so that they fit snugly thereinto. Trays 18 therefore occupy substantially all the area of bucket 12 when considered in plan, but have sufficient clearance to preclude being locked therein by vacuum or friction.

Figure 2:
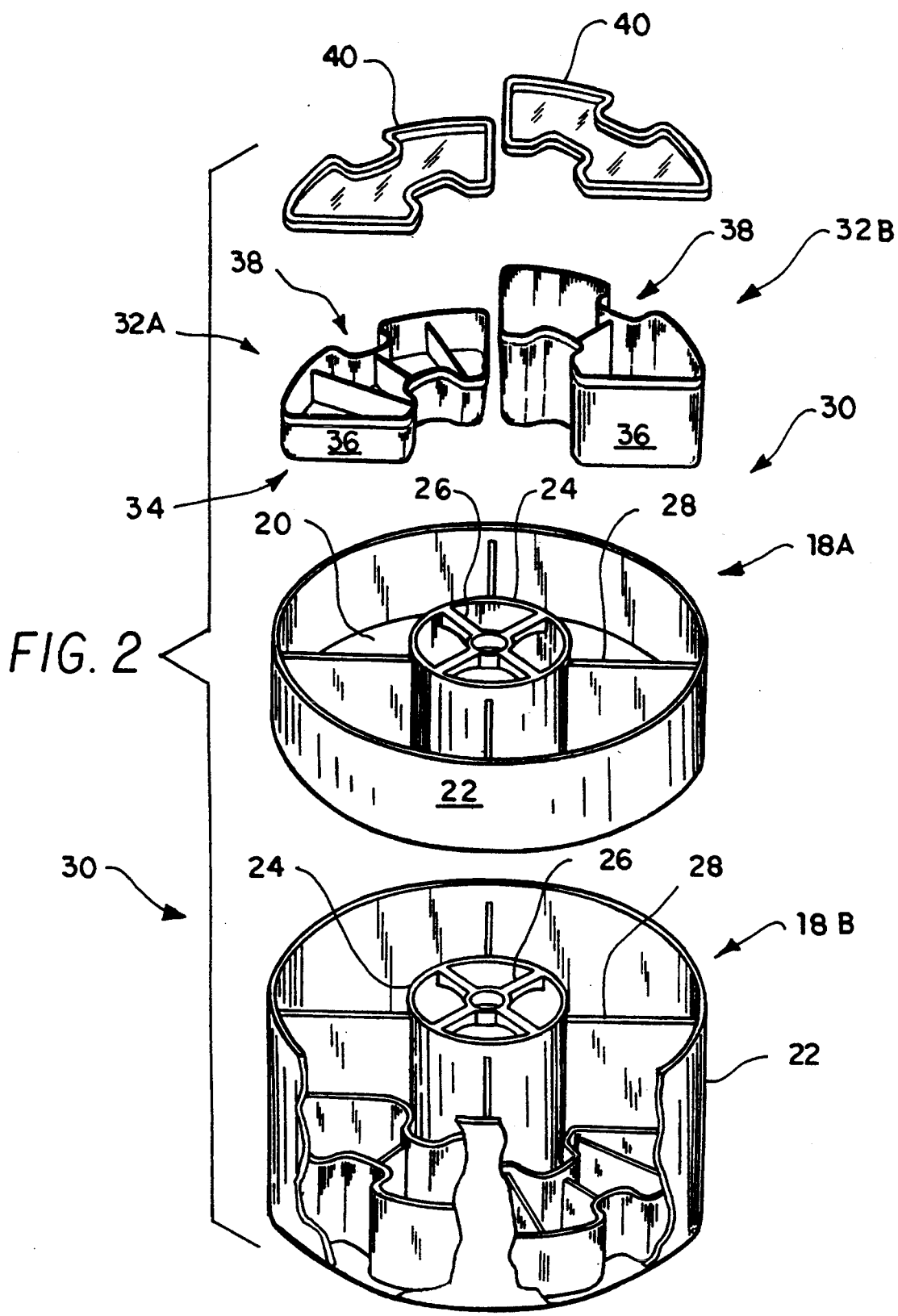
FIG. 2 is an exploded, perspective view of the novel trays and inserts.

Turning now to FIG. 2, trays 18 and associated inserts 32 will be discussed in further detail. Trays are provided in plural sizes, referring to the height. Preferably, there are low trays 18A and high trays 18B, with the height of a high tray 18B equal to the combined height of two low trays 18A. In all other respects, trays 18A and 18B are equivalent and interchangeable.

Figure 3:
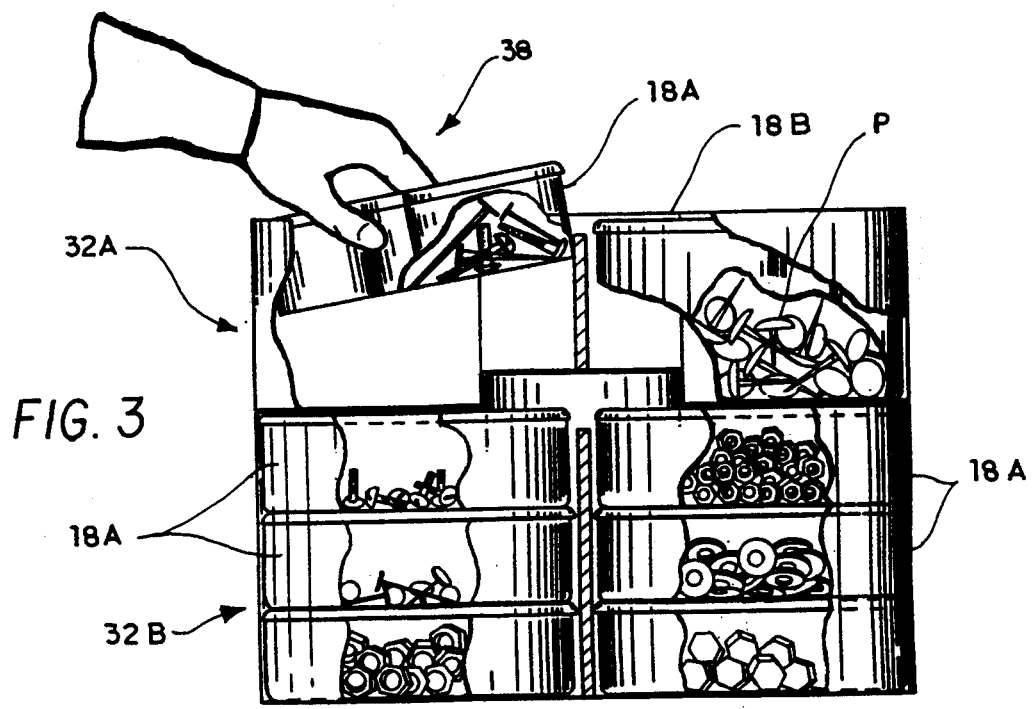
FIG. 3 is a side elevational, environmental view, partially broken away to reveal internal detail, of an insert being removed from a tray, drawn to enlarged scale.

Compartments 30 are lined by inserts 32, each individually insertable into and removable from a tray 18. Each insert 32 has a floor 34 and an upstanding, outer wall 36. The wall narrows in the middle to define a constricted neck portion 38. As seen in FIG. 3, neck portion 38 provides an area which can be grasped by a user to remove an individual insert 32 from its associated tray 18. Even if this insert 32 is filled with objects P (see FIG. 3), the neck portion 38 allows the user's fingers unobstructed access for grip.

It will be noted in this Figure that inserts 32 cooperate in close fitting fashion with trays 18, wherein a tray 18A of low height is stacked on a tray 18B of high height.

Again referring to FIG. 2, in the manner of trays 18, inserts 32 are also provided having variable height. An insert 32A of low height and an insert 32B of high height are illustrated. Both inserts 32A,32B are optionally provided, in an alternative embodiment, with tightly fitting caps 40. This feature is useful in preventing spillage of insert contents and in storing perishables in receptacle 10.

Figure 4:
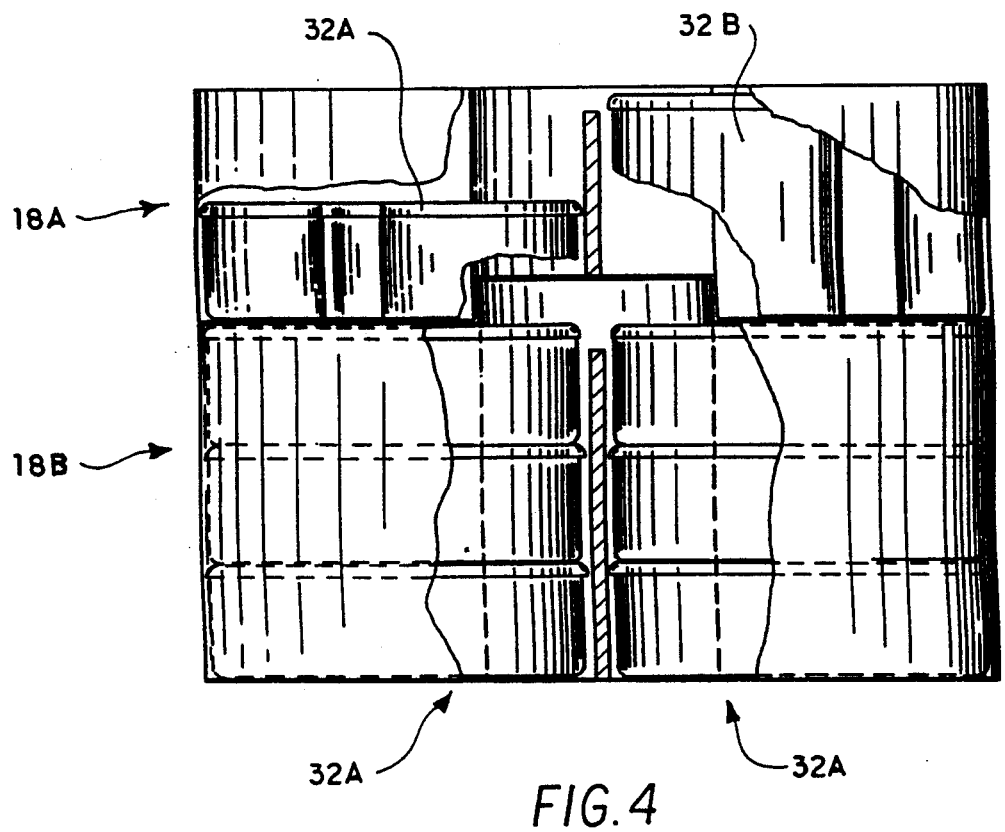
FIG. 4 is a side elevational view of two stacked trays, partially broken away to reveal inserts placed in both trays, drawn to enlarged scale.

The modular nature of receptacle 10 is best shown in FIG. 4. Tray 18B accommodates inserts 32A of low height. But tray 18A, located above, has one insert 32B of high height, and other inserts 32A of low height.

Thus, it will be seen that the improvements disclosed herein add several dimensions to the partitioning of a bucket 12 or other receptacle. Removable trays 18 divide the bucket 12 vertically into tiers, which are selectively variable as to height. Inserts 32 subdivide each tier into self-contained, individually removable, adjacent compartments. Both trays 18 and inserts 32 include means for grasping and removing, even when the tray or insert if filled with objects.

While the arrangement of trays 28 and inserts 32 has been illustrated in one particular way, many combinations of lateral and vertical spacing are enabled. For example, a user may select only low or only high trays and inserts. High trays may be placed either above or below low trays. Similarly, any one particular tray may be provided with high or low inserts regardless of the trays' order.

It is to be understood that the present invention is not limited to the embodiments described above, but encompasses any and all embodiments within the scope of the following claims.

I claim:

1. A partitioning arrangement for a storage and dispensing receptacle comprising:
   a bucket;
   a plurality of vertically stackable trays, each of said trays having:
      a bottom and an upstanding, perimetric wall,
      each of said trays having a configuration conforming to the configuration of the bucket and is inserted thereinto,
      each of said trays having a height dimension, at least one of said trays having a low said height dimension, and at least one of said trays having a high said height dimension, wherein the bucket holds said trays; and
   a plurality of inserts removably inserted into said trays, each of said inserts having:
      a floor;
      an upstanding, outer wall having a constricted neck portion extending to said floor,
      each of said inserts being dimensioned and configured to cooperate with other said inserts such that at least two of said inserts are insertable into any one said tray, whereby the bucket is vertically divided into tiers, and each tier is subdivided into adjacent compartments.

2. The partitioning arrangement according to claim 1, each of said inserts having a height dimension, there being at least one of said inserts having a low said height dimension, and at least one of said inserts having a high said height dimension, whereby any one of said trays holds at least two of said inserts.

3. The partitioning arrangement according to claim 2, wherein two said inserts having a low said height dimension have a combined height dimension equal to said height dimension of said insert having a high said height dimension.

4. The partitioning arrangement according to claim 3, wherein two said trays having a low said height dimension have a combined height dimension equal to said height dimension of said tray having a high said height dimension.

5. The partitioning arrangement according to claim 1, wherein two said trays having a low said height dimension have a combined height dimension equal to said height dimension of said tray having a high said height dimension.

6. The partitioning arrangement according to claim 1, each one of said inserts having a tightly fitting cap.

7. The partitioning arrangement according to claim 1, each one of said trays having a central column having a wall defining a hollow center, there being handle members spanning said wall, whereby said tray is readily grasped and lifted by hand.

8. A partitioning arrangement for a storage and dispensing receptacle comprising:

a bucket;

a plurality of vertically stackable trays, each of said trays having:

a bottom and an upstanding, perimetric wall, a central column having a hollow center, there being handle members spanning said hollow center, whereby said tray is readily grasped and lifted by hand, each of said trays having a configuration conforming to the configuration of the bucket and is inserted thereinto, a plurality of inserts removably inserted into said trays, each of said inserts having:

a floor;

an upstanding, outer wall, dimensioned and configured to have a constricted neck portion extending to said floor, each of said inserts having a height dimension, at least one of said inserts having a low said height dimension, and at least one of said inserts having a high said height dimension, said trays hold said inserts and each of said inserts being dimensioned and configured to cooperate in close fitting fashion with each of said trays, and to cooperate with other said inserts such that at least two of said inserts are insertable into any one said tray, whereby the bucket is vertically divided into tiers, and each tier is subdivided into adjacent compartments.

9. The partitioning arrangement according to claim 8, wherein two said inserts having a low said height dimension have a combined height dimension equal to said height dimension of said insert having a high said height dimension.

10. The partitioning arrangement according to claim 8, each one of said inserts having a tightly fitting cap.

11. A partitioning receptacle consisting essentially of:

a receptacle having a lowermost panel and an upstanding, bounding wall, and having means defining an upward opening therein;

a plurality of vertically stackable trays, each of said trays having:

a bottom and an upstanding, perimetric wall;

a central column having a hollow center;

handle members spanning the hollow center of said central column, each of said trays having a height dimension, at least one of said trays having a low said height dimension, and at least one of said trays having a high said height dimension, said receptacle holds said trays; and a plurality of inserts removably inserted into each of said trays, each of said inserts having:

a floor;

an upstanding, outer wall having a constricted neck portion extending to said floor;

each of said inserts being dimensioned and configured to cooperate in close fitting fashion with each of said trays, and to cooperate with other said inserts such that said inserts are insertable into any one said tray, whereby said receptacle is vertically divided into tiers, and each tier is subdivided into adjacent compartments.

12. The partitioned receptacle according to claim 11, each of said inserts having a height dimension, there being at least one of said inserts having a low said height dimension, and at least one of said inserts having a high said height dimension, whereby any one of said trays holds said inserts.

13. The partitioned receptacle according to claim 12, wherein two said inserts having a low said height dimension have a combined height dimension equal to said height dimension of said insert having a high said height dimension.

14. The partitioned receptacle according to claim 12, wherein two said trays having a low said height dimension have a combined height dimension equal to said height dimension of said tray having a high said height dimension.

15. The partitioned receptacle according to claim 11, wherein two said trays having a low said height dimension have a combined height dimension equal to said height dimension of said tray having a high said height dimension.

* * * * *